US 8,206,681 B2

(12) United States Patent
Garetto

(10) Patent No.: US 8,206,681 B2
(45) Date of Patent: Jun. 26, 2012

(54) PROCESS FOR PRODUCING RED IRON OXIDE

(75) Inventor: Francesco Garetto, Turin (IT)

(73) Assignee: Rockwood Italia SpA (IT)

(*) Notice: Subject to any disclaimer, the term of this patent is extended or adjusted under 35 U.S.C. 154(b) by 0 days.

(21) Appl. No.: 12/672,455

(22) PCT Filed: Feb. 15, 2008

(86) PCT No.: PCT/EP2008/051896
§ 371 (c)(1),
(2), (4) Date: Sep. 17, 2010

(87) PCT Pub. No.: WO2009/100767
PCT Pub. Date: Aug. 20, 2009

(65) Prior Publication Data
US 2011/0076224 A1    Mar. 31, 2011

(51) Int. Cl.
*C01G 49/00*    (2006.01)
(52) U.S. Cl. .................. 423/632; 423/633; 423/634
(58) Field of Classification Search .......... 423/140–147, 423/632–634
See application file for complete search history.

(56) References Cited

U.S. PATENT DOCUMENTS

| 3,382,174 A | 5/1968 | Hund |
| 3,946,103 A | 3/1976 | Hund |
| 4,729,846 A * | 3/1988 | Matsui et al. .............. 252/62.56 |
| 4,748,017 A * | 5/1988 | Matsui et al. ................ 423/634 |
| 7,144,455 B2 | 12/2006 | Meisen |

FOREIGN PATENT DOCUMENTS

| DE | 1040155 | 10/1958 |
| DE | 3700943 | 7/1987 |
| EP | 0040722 A1 | 12/1981 |
| EP | 0391388 | * 10/1990 |
| FR | 1498479 | 10/1967 |
| FR | 1519503 | 4/1968 |
| IN | 174841 | 3/1995 |
| JP | 2293329 A | 12/1990 |

OTHER PUBLICATIONS

European Patent Office, Communication pursuant to Article 94(3) EPC, in Application No. 08709045.2, dated Apr. 4, 2011.
Patent Cooperation Treaty, International Preliminary Report on Patentability and Written Opinion of the International Searching Authority, in Application No. PCT/EP2008/051896, dated Aug. 17, 2010.
Database WPI Week 199103 Thomson Scientific, London, GB; AN 1991-019601 XP002506385 & JP 02 293329 A (SHOWA DENKO KK) Dec. 4, 1990.

* cited by examiner

*Primary Examiner* — Steven Bos
(74) *Attorney, Agent, or Firm* — McAndrews, Held & Malloy, Ltd.

(57) ABSTRACT

The present invention relates to a process for producing red iron oxide with only marginal goethite content, wherein a ferrous chloride feedstock is employed as starting material. The process comprises precipitating lepidocrocite seeds having a high BET surface area by mixing the ferrous chloride feedstock with an alkali and oxidizing the obtained mixture, and growing the lepidocrocite seeds, whereby the lepidocrocite converts into red iron oxide.

16 Claims, No Drawings

PROCESS FOR PRODUCING RED IRON OXIDE

RELATED APPLICATION

This application is a 371 National Phase filing of International Patent Application Serial No. PCT/EP2008/051896 filed Feb. 15, 2008. The above application is incorporated herein by reference in its entirety.

FIELD OF THE INVENTION

The present invention relates to a process for producing red iron oxide and, more particularly, to a process for producing red iron oxide with only marginal goethite content.

BACKGROUND OF THE INVENTION

Red iron oxides are commonly used as pigments for colouring of construction materials, paints and coatings, plastics, paper, cosmetics and the like. In addition they may be used as catalysts in chemical reactions such as conversion of ethylbenzene to styrene and as burn rate control agents for solid rocket fuel. For these applications products typically have a small (0.1 micron to 3 micron particle size and preferably consist of pure hematite crystals with minimal content of other iron oxide crystal types.

Most of the processes commonly used to produce red iron oxides employ iron sulphate as starting material. However, iron sulphate feedstock is becoming increasingly difficult and expensive to obtain due to closure of titanium dioxide plants based on sulphate technology, reduction of steel pickling operations using sulphuric acid in Western Europe and the U.S.A., and increased use of ferrous sulphate as a reductive for chromium (VI) in the cement industry. The alternative of dissolving scrap steel in sulphuric acid is becoming increasingly costly as well and necessitates design of reactors to manage the hydrogen liberated.

In addition, environmental concerns are related to the red iron oxides production processes based on iron sulphate. During annealing of iron sulphate, sulphur gases are released which must be collected and converted back to sulphuric acid in a sulphuric acid plant while not reacted iron sulphate in the product is typically neutralized to give a gypsum waste stream. In precipitation processes a salt solution is generated which must be treated before release to the environment, typically by evaporation to sodium or ammonium sulphate. Moreover, red iron oxides obtained from sulphate precipitation processes usually contain significant quantities of goethite which reduces the brightness and colouring strength of the hematite pigment.

In contrast to ferrous sulphate solutions, ferrous chloride solutions are more readily available, for example, from pickling of steel or beneficiation of ilmenite ores by acid leaching processes. Typically, ferrous chloride pickling wastes have been disposed by roasting to recycle the hydrochloric acid value while generating a very low value iron oxide by-product. Alternately, ferrous chloride pickling wastes are neutralized and disposed in a landfill. However, the ferrous chloride by-products contain a significant level of impurities such as manganese and zinc, which can have negative effects on pigment production processes.

French patent 1498479 describes a process for precipitation of an iron hydroxide gel or goethite from a ferric salt solution and subsequent thermal treatment under hydrothermal conditions (above 100° C.), typically above 120° C. and up to 250° C. to transform this gel to ferric oxide.

A process for production of red iron oxide pigments from ferrous chloride solutions with the added advantage of calcium chloride recovery is described in Indian patent 174841. The process involves neutralization of the ferrous chloride with calcium hydroxide followed by oxidation over 4 to 6 hours, separation of the calcium chloride solution for recovery, washing, drying and calcining the product iron oxide at 750° C. to 800° C. to achieve the target iron oxide.

German patent 1040155 discloses a process for precipitation of red iron oxides without a calcination step. Metallic iron is treated with oxygen containing gases in an aqueous iron (II) salt solution containing seeds of iron oxide or iron oxide hydroxide, wherein the seeds are prepared from precipitation of iron (II) ions by addition of alkali or alkaline earth hydroxides or carbonates. Both ferrous sulphate and ferrous chloride are suitable.

Methods for producing a precipitated red iron oxide pigment having low goethite contents are described in U.S. Pat. No. 3,946,103, wherein a product with a goethite content of less than 15% is obtained.

U.S. Pat. No. 7,144,455 relates to a method for precipitating yellow iron oxide pigments (goethite) from ferrous chloride solutions and their use in preparing red iron oxide pigments by calcination.

There remains a need for cost effective production methods for red iron oxide pigments having a low goethite content or being essentially free of goethite.

SUMMARY OF THE INVENTION

It is an object of the present invention to provide a process for producing high quality red iron oxides from a ferrous chloride feedstock.

There are significant differences between growth of red oxides in chloride and sulphate systems. In the sulphate process the seed is typically a mixture of various iron oxide species including but not limited to one or more of hematite, goethite, lepidocrocite and/or magnetite. When grown at normal conditions in the presence of metallic iron at elevated temperatures all of these species typically convert to small particle hematite. However, in the case of chloride feedstock the goethite seeds will not transform to hematite but persist as goethite throughout the growth reaction with a significant negative effect on the red colour quality.

Thus, it is a further object of the present invention to provide a process for producing red iron oxides being substantially free of goethite.

It is a further object of the present invention to provide a process for producing red iron oxides that utilizes a ferrous chloride by-product as a ferrous chloride feedstock.

DETAILED DESCRIPTION OF THE INVENTION

In one embodiment of the invention, a process for producing red iron oxide is provided, comprising the steps of providing a ferrous chloride feedstock, precipitating high surface area lepidocrocite seeds having a BET surface area of greater than about 175 m$^2$/g by mixing the ferrous chloride feedstock with an alkali, oxidizing the obtained mixture, and growing the lepidocrocite seeds, whereby the lepidocrocite converts into red iron oxide.

In another embodiment of the invention, high surface area lepidocrocite seeds having a BET surface area of greater than about 175 m$^2$/g are provided.

According to one exemplary embodiment of the present invention, the high surface area lepidocrocite seeds are obtainable by a process, comprising providing a ferrous chloride feedstock, and precipitating the high surface area lepidocrocite seeds having a BET surface area of greater than about 175 m$^2$/g by mixing the ferrous chloride feedstock with an alkali and oxidizing the obtained mixture.

In exemplary embodiments of the invention, the ferrous chloride feedstock can have any ferrous iron concentration above 5%, e.g. from 15% to 22%, or about 20%.

In one embodiment of the invention, the ferrous chloride feedstock can be diluted for the precipitation of the seeds and can contain iron concentrations from about 5 to 100 g/l, such as from about 20 to 50 g/l, or from about 30 to 40 g/l.

The ferrous chloride feedstock can be a waste or by-product obtained from industrial processes, e.g., from pickling of steel or beneficiation of ilmenite ores by acid leaching processes. Ferrous chloride by-product or waste solutions suitable for the process of exemplary embodiments of this invention may contain significant levels of impurities. For example, the ferrous chloride feedstock can contain at least one of ferric iron, aluminium, calcium, chromium, magnesium, manganese, or zinc, or any other contaminant typically occurring in technical grade feedstocks.

In an exemplary feedstock composition, ferrous iron can be present in any amount that is soluble in the feedstock, e.g., up to 23%, or about 20%. Typically, aluminium can be present in the feedstock in an amount from 0 to 1200 ppm, such as from about 300 to 900 ppm, or at about 600 ppm. Typically, calcium can be present in an amount from 0 to 2300 ppm, such as from about 750 to 1500 ppm, or at about 1100 ppm. Typically, chromium can be present in an amount from 0 to 300 ppm, such as from about 80 to 230 ppm, or at about 150 ppm. Typically, magnesium can be present in an amount from 0 to 4600 ppm, such as from 1500 to 3000 ppm, or at about 2300 ppm. Typically, manganese can be present in the feedstock in an amount from 0 to 2300 ppm, such as from 750 to 1500 ppm, or at about 1100 ppm. Typically, zinc can be present in an amount from 0 to 300 ppm, such as from 80 to 230 ppm, or at about 150 ppm. However, depending on the origin of the feedstock the type and amount of impurities can differ from those set out above.

In an exemplary embodiment, the ferrous chloride feedstock contains about 15% ferrous iron, and, independently of each other, about 600 ppm aluminium, and/or about 1100 ppm calcium, and/or about 150 ppm chromium, and/or about 225 ppm magnesium, and/or about 1100 ppm manganese and/or about 150 ppm zinc.

The ferrous chloride feedstock may be pre-treated before use in the process of exemplary embodiments of the invention, for example, to remove contaminants or other undesirable components.

In one embodiment, the process for producing red iron oxide further comprises the step of first purifying the ferrous chloride feedstock, for example, by reacting with one of iron or alkali. The alkali can be, e.g., selected from at least one of sodium hydroxide, potassium hydroxide or ammonia, or other suitable alkalis such as carbonates of alkaline or alkaline earth metals. The purification can be carried out at an acidic pH value, for example, a pH from about 3 to 5.

According to exemplary embodiments of the process of the present invention, the high surface area lepidocrocite seeds are precipitated by mixing the ferrous chloride feedstock with an alkali and oxidizing the obtained mixture. The high surface area lepidocrocite (γ-FeOOH) seeds have a BET surface area of greater than about 175 m$^2$/g. The BET surface area of the precipitated lepidocrocite seeds can be determined using the single point method in accordance with DIN 66131, wherein the seeds previously have been out-gassed under nitrogen for 15 min at a temperature of 150° C.

The precipitation can be carried out at temperatures from about 5 to 25° C., from about 10 to 20° C., or from about 12 to 17° C. Without wishing to be bound to any theory, it is believed that low temperatures favour the formation of lepidocrocite seeds having higher surface areas. The alkali can be added in an almost stoichiometric amount, e.g. in an amount that is sufficient to precipitate 90 to 110% of the iron present in the ferrous chloride feedstock. The alkali can be selected from at least one of sodium hydroxide, potassium hydroxide or ammonia. Other potentially suitable alkalis such as carbonates of alkaline or alkaline earth metals may also be used. The final pH value of the mixture can be from about 3 to 9.

In essence, to produce substantially goethite-free lepidocrocite seeds having a high BET surface area, the particle or crystallite size of the seeds should be kept as low as possible. In the embodiments of the invention this can be achieved by one or several measures as described in the following.

For example, in exemplary embodiments, one option is that the oxidation is rapidly carried out in about 20 to 80 minutes, preferably in less than one hour, such as from about 10 to 60 minutes, or from about 15 to 45 minutes. The oxidant can be selected from at least one of air, oxygen, or hydrogen peroxide. Rapid oxidation, i.e. oxidation within a short period of time, has a beneficial effect on the formation of high surface area lepidocrocite.

In one embodiment, another option is that the oxidation is carried out simultaneously with mixing the alkali and the ferrous chloride feedstock. Without wishing to be bound to any theory, it is believed that carrying out the oxidation simultaneously with the precipitation initiated by addition of alkali has a favourable effect on the development of high surface area lepidocrocite crystals. Thus, it is preferred that the oxidation rate in the reaction mixture at the time of alkali addition is sufficient to oxidize the just precipitated seeds substantially instantaneously to lepidocrocite. The inventors have observed that a precipitation which proceeds too fast in relation to the oxidation rate will generate lepidocrocite seeds having a low BET surface area (i.e. below 175 m$^2$/g) or lead to the presence of other species such as goethite. Also, without being bound to any theory, it is believed that strong agitation of the mixture during oxidation facilitates the precipitation of the high surface area lepidocrocite seeds at small crystallite sizes.

All these options may be used individually or in combination with each other to produce the lepidocrocite having the desired high surface area.

The processes of the embodiments of the invention can be carried out in any reactor arrangement that is suitable for precipitation and oxidation reactions, e.g., in a vessel with an air sparger, a vessel with a mechanical agitator, particularly a high efficiency agitator to promote gas dispersion, or a vessels arranged with an internal or external recirculation system.

In one embodiment, the processes of the embodiments of the invention can be carried out in the presence of a recycled chloride salt solution which enables a higher salt concentration in the final solution. In another embodiment the salts of the final solution are recycled.

In exemplary embodiments of the invention, the growing of the lepidocrocite seeds is accomplished by adding further ferrous chloride feedstock and alkali to the obtained mixture comprising the precipitated high surface lepidocrocite seeds. For example, the ferrous chloride feedstock can be used undiluted, having an ferrous iron concentration from about 5 to 23%, preferably about 15%. The alkali may be one of those described above. The addition may be done simultaneously or sequentially in any order. During the growth step, the lepidocrocite converts into red iron oxide. The growing of the lepidocrocite seeds can be carried out at temperatures equal or above 80° C., such as from about 80 to 110° C., such as from about 85 to 95° C., preferably from about 90 to 95° C., at a suitable pH of the mixture, depending on the type, amount and ratio of alkali and ferrous chloride feedstock added. In exemplary embodiments, the growing of the seeds can be carried out at an overall acidic pH, e.g. a pH value from about 3.5 to 5.5.

In another embodiment of the invention, the growing of the lepidocrocite seeds can be accomplished by oxidizing at high temperatures in the presence of metallic iron.

The growing of the lepidocrocite seeds can be carried out at temperatures above about 80° C.

After completion of the growth reaction, the alkali salt formed can be separated and recovered. Typically, the resulting red iron oxide suspension is filtered and washed, e.g. by conventional processes such as vacuum or pressure filtration, to remove water soluble salts. Subsequently, the obtained filter cake can be dried and milled by conventional means to give the useful red iron oxide suitable for colouring applications.

In one embodiment, the chloride salts formed during the processes of the embodiments of the invention can be recycled.

In one embodiment the filtration is carried out in such a way that a high chloride salt solution is obtained which can be used for salt recovery.

EXAMPLES

The crystal phases present in the obtained seeds and red iron oxides can be determined by XRD measurements. In the examples provided, XRD measurements were done using a Philips XPert-Pro diffractometer using cobalt radiation. The BET surface area of the samples was determined using the single point method in accordance with DIN 66131 after out-gassing the sample for 15 minutes at 150° C. under nitrogen.

Colour measurements were performed by preparing a mixture of 0.5 g of the obtained red iron oxide in 30 g of white cement (Acquila Bianca), which has been sieved through a 600 mesh sieve, with 50 g of 3 mm glass beads. The mixture was shaken for 16 min. Subsequently, the beads were separated by sieving through a 100 mesh sieve and the coloured cement was pressed out on paper using a glass plate. The colour value was determined using a Gardner spectrophotometer under D65 illumination (2° observer with specular component excluded). The colours were compared to commercial iron oxide pigments supplied by Rockwood Pigments, namely Ferroxide 212 and Ferroxide 218. The data are reported in CIELAB units.

Comparison Example 1

A 20 l vessel equipped with an agitator was charged with a ferrous sulphate solution having an iron concentration of 22 g/l. The initial temperature was 17° C. Over a time period of 20 min sodium hydroxide was added in an amount that is sufficient to precipitate 92% of the iron present. Beginning with the start of alkali addition, the mixture was simultaneously oxidized with oxygen at a rate of 300 l/h over a time period of 100 min. The final pH was 4.4 and the final temperature 25° C. The seed had a BET surface area of 120 m²/g and exhibited a significant amount of goethite phase.

The seed was heated to 90° C. over 7 hours. After this treatment the seed contained a mixed phase of goethite and hematite with a surface area of 68 m²/g.

Subsequently, the suspension was oxidized with air in the presence of iron at 90° C., wherein the pH was maintained around 5.0, to achieve a colour equivalent to Ferroxide Red 212.58 g of oxide seed yielded 190 g of product iron oxide. The obtained red iron oxide contained traces of goethite.

Comparison Example 2

A 20 l vessel equipped with an agitator was charged with a ferrous chloride solution having an iron concentration of 22 g/l. The initial temperature was 17° C. Over a time period of 20 min sodium hydroxide was added in an amount that is sufficient to precipitate 92% of the iron present. Beginning with the start of alkali addition, the mixture was simultaneously oxidized with oxygen at a rate of 750 l/h over a time period of 74 min. The final pH was 3.2 and the final temperature 31° C. The seed had a BET surface area of 95 m²/g and exhibited a mixed phase of lepidocrocite and goethite.

The seed was heated to 90° C. over 7 hours. After this treatment the seed constituted a goethite phase with a BET surface area of 62 m²/g.

Subsequently, the suspension was oxidized with air at 90° C. with the simultaneous addition of ferrous chloride and ammonia to maintain a pH around 5.0. The final product consisted principally of goethite and was not comparable to the target red shades Ferroxide 212 or Ferroxide 218.

Comparison Example 3

A 300 l reactor equipped with an agitator was charged with 180 l of a ferrous chloride solution having an iron concentration of 24 g/l. The initial temperature was 24° C. Over a time period of 20 min aqueous ammonia was added in an amount that is sufficient to precipitate 95% of the iron present. Beginning with the start of alkali addition, the mixture was simultaneously oxidized with oxygen at a rate of 10 m³/h over a time period of 35 min. The final pH was 5.0 and the final temperature 33° C. The seed had a BET surface area of 120 m²/g and exhibited primarily lepidocrocite but with a significant component of goethite.

The seed was heated to 90° C. over 3.25 hours. Subsequently, the seeds in the reaction mixture were grown by a simultaneous addition of ferrous chloride and aqueous ammonia at a pH of 4.0 to yield 180 g product from 60 g seed. At that point the colour values were very light, much less red and blue compared to standard Ferroxide 212. X-ray diffraction revealed that the sample was a mixture of hematite and goethite.

| Sample | CIELAB Colours | | | |
| --- | --- | --- | --- | --- |
|  | DL | DA | DB | DE |
| Comparison example 3 | 3.1 | −8.9 | −3.7 | 1.05 |

As can be seen from the goethite content and the low BET surface area, the oxidation rate at seed formation was apparently insufficient, probably due to insufficient agitation and/or insufficient oxidation rate.

Example 1

A 20 l vessel equipped with an agitator was charged with a ferrous chloride solution having an iron concentration of 26 g/l. The initial temperature was 12° C. Over a time period of 20 min sodium hydroxide was added in an amount that is sufficient to precipitate 110% of the iron present. Then, the mixture was oxidized with oxygen at a rate of 700l/h over a time period of 44 min. The final pH was 8.9 and the final temperature 24° C. The seed had a BET surface area of 190 m$^2$/g and exhibited a phase of lepidocrocite.

The seed was heated to 90° C. over 2 hours. After this treatment the seed still exhibited a lepidocrocite phase with a BET surface area of 185 m2/g.

The seeds in the reaction mixture were grown by a simultaneous addition of ferrous chloride and aqueous ammonia at a pH of 4.0 to yield 225 g product from 60 g seeds. At that point the colour values were slightly greener than the standard Ferroxide 212. The colour data indicate that the sample is slightly light (DL is +0.5), green (DA=−0.9) and very slightly blue (DB=−0.2) compared to the control sample. X-ray diffraction showed the sample was almost totally converted to hematite.

|  | CIELAB Colours | | | |
|---|---|---|---|---|
| Sample | DL | DA | DB | DE |
| Example 1 | 0.5 | −0.9 | −0.2 | 1.05 |

Example 2

A 300 l reactor equipped with an agitator was charged with 180 l of a ferrous chloride solution having an iron concentration of 25 g/l. The initial temperature was 25° C. Over a time period of 35 min aqueous ammonia was added in an amount that is sufficient to precipitate 95% of the iron present. Beginning with the start of alkali addition, the mixture was simultaneously oxidized with oxygen at a rate of 15 m$^3$/h over a time period of 40 min. The final pH was 5.0 and the final temperature 33° C. The seed had a BET surface area of 290 m$^2$/g and exhibited only lepidocrocite.

The seed was heated to 90° C. over 4 hours. After this treatment the seed still exhibited a lepidocrocite phase with a BET surface area of 225 m$^2$/g.

The seeds in the reaction mixture were grown by a simultaneous addition of ferrous chloride and aqueous ammonia at a pH of 4 to yield 170 g product from 60 g seeds. At that point the colour values were slightly redder than the standard Ferroxide 212. X-ray diffraction showed the sample was almost totally converted to hematite.

|  | CIELAB Colors | | | |
|---|---|---|---|---|
| Sample | DL | DA | DB | DE |
| Example 2 | −0.02 | 0.38 | 0.02 | 1.05 |

This example was performed with an excess of ferrous chloride in the seed reaction mixture and gave a very good colour match and complete conversion to hematite, when using a seed which was free from goethite.

The invention claimed is:

1. A process for producing red iron oxide, comprising:
    providing a ferrous chloride feedstock,
    precipitating high surface area lepidocrocite seeds having a BET surface area of greater than 175 m$^2$/g by mixing the ferrous chloride feedstock with an alkali and oxidizing the obtained mixture, and
    growing the lepidocrocite seeds at an overall acidic pH, wherein the growing of the lepidocrocite seeds is carried out by adding further ferrous chloride feedstock and alkali to said mixture, whereby the lepidocrocite converts into hematite.

2. The process of claim 1, wherein the ferrous chloride feedstock is diluted to ferrous iron concentrations from about 20 to 50 g/l.

3. The process of claim 1, further comprising the step of first purifying the ferrous chloride feedstock by reacting the ferrous chloride feedstock with one of iron or alkali.

4. The process of claim 1, wherein chloride salts are formed during the process, further comprising the step of recovering the chloride salts.

5. The process of claim 1, wherein the lepidocrocite seed precipitation is carried out at temperatures from about 5 to 25° C.

6. The process of claim 1, wherein the alkali is added in an amount that is sufficient to precipitate 90 to 110% of the iron present in the feedstock.

7. The process of claim 1, wherein the alkali is selected from at least one of sodium hydroxide, potassium hydroxide or ammonia.

8. The process of claim 1, wherein the oxidizing is carried out using oxidants selected from at least one of air, oxygen, or hydrogen peroxide.

9. The process of claim 1, wherein the oxidizing is carried out simultaneously with mixing the alkali and the ferrous chloride feedstock.

10. The process of claim 1, wherein the oxidizing is rapidly carried out in 20 to 80 minutes.

11. The process of claim 1, wherein the growing of the lepidocrocite seeds is carried out at temperatures equal or above 80° C.

12. The process of claim 1, wherein the ferrous chloride feedstock is undiluted, having a ferrous iron concentration from about 5 to 23% by weight.

13. The process of claim 1, wherein the growing of the lepidocrocite seeds is carried out by oxidizing the seeds at high temperatures in the presence of metallic iron.

14. The process of claim 1, wherein the red iron oxide is substantially free of goethite.

15. The process of claim 1, wherein the growing of the lepidocrocite seeds is carried out at temperatures from about 90 to 95° C.

16. The process of claim 1, wherein the ferrous chloride feedstock is undiluted, having a ferrous iron concentration of about 15% by weight.

* * * * *